(12) United States Patent
Yun et al.

(10) Patent No.: US 9,588,375 B2
(45) Date of Patent: Mar. 7, 2017

(54) DISPLAY DEVICE AND METHOD OF MANUFACTURING THE SAME

(71) Applicant: Samsung Display Co., Ltd., Yongin, Gyeonggi-do. (KR)

(72) Inventors: Hae Ju Yun, Yongin (KR); Soo Jung Lee, Yongin (KR); Jung Wook Lee, Yongin (KR); Gwan Ha Kim, Yongin (KR); Sung Jun Kim, Yongin (KR); Jung Ha Son, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 233 days.

(21) Appl. No.: 14/095,210

(22) Filed: Dec. 3, 2013

(65) Prior Publication Data

US 2015/0036079 A1 Feb. 5, 2015

(30) Foreign Application Priority Data

Aug. 1, 2013 (KR) ........................ 10-2013-0091574

(51) Int. Cl.
   *G02F 1/1339* (2006.01)
   *G02F 1/1337* (2006.01)
   *G02F 1/1333* (2006.01)
   *G02F 1/1341* (2006.01)

(52) U.S. Cl.
   CPC ...... *G02F 1/1337* (2013.01); *G02F 1/133377* (2013.01); *G02F 1/1341* (2013.01)

(58) Field of Classification Search
   CPC ................ G02F 1/1334; G02F 1/1337; G02F 1/133377; G02F 1/1341
   USPC .................................................. 349/155–157
   See application file for complete search history.

(56) References Cited

U.S. PATENT DOCUMENTS

| 5,831,704 A | * | 11/1998 | Yamada | ............ G02F 1/133345 349/110 |
| 2001/0004279 A1 | * | 6/2001 | Sako | ................. G02F 1/133371 349/158 |
| 2003/0038912 A1 | * | 2/2003 | Broer | ..................... C09K 19/00 349/122 |

(Continued)

FOREIGN PATENT DOCUMENTS

| KR | 10-2012-0026880 | 3/2012 |
| KR | 10-2014-0071550 | 6/2014 |
| KR | 10-2014-0092662 | 7/2014 |

*Primary Examiner* — Charles Chang
(74) *Attorney, Agent, or Firm* — Knobbe Martens Olson & Bear LLP

(57) ABSTRACT

A display device and a method of manufacturing a display device are capable of preventing an alignment layer from being lumped in a microcavity. The display device includes: a substrate; a thin film transistor formed on the substrate; a pixel electrode connected to the thin film transistor; a roof layer formed on the pixel electrode; microcavities interposed between the pixel electrode and the roof layer; an injection hole formed in the roof layer, the injection hole configured to expose at least a portion of the microcavities; a first valley extended in one direction between the microcavities; an alignment layer formed on the pixel electrode, under the roof layer, and in the first valley; a liquid crystal layer filled in the microcavities; and an encapsulation layer formed on the roof layer, the encapsulation layer configured to cover the injection hole and to seal the microcavities.

15 Claims, 19 Drawing Sheets

(56) References Cited

U.S. PATENT DOCUMENTS

| | | | |
|---|---|---|---|
| 2005/0140890 A1* | 6/2005 | Kim | G02F 1/133305 349/139 |
| 2007/0139593 A1* | 6/2007 | Chen | G02F 1/1337 349/123 |
| 2007/0165172 A1* | 7/2007 | Takatori | G02F 1/133707 349/139 |
| 2012/0062448 A1* | 3/2012 | Kim | G02F 1/133377 345/55 |
| 2013/0286312 A1* | 10/2013 | Choi | G02F 1/136 349/42 |

* cited by examiner

Hydrophilic treatment

DISPLAY DEVICE AND METHOD OF MANUFACTURING THE SAME

CROSS-REFERENCE TO RELATED APPLICATIONS

This application claims priority to, and the benefit of, Korean Patent Application No. 10-2013-0091574 filed in the Korean Intellectual Property Office on Aug. 1, 2013, the entire contents of which are incorporated herein by reference.

BACKGROUND

Field

The present disclosure relates to a display device and a method of manufacturing the display device capable of preventing an alignment layer from being lumped in a microcavity.

Description of the Related Technology

A liquid crystal display, which is one of the more common types of flat panel displays currently in use, typically includes two sheets of display panels with field generating electrodes such as a pixel electrode and a common electrode formed thereon, and a liquid crystal layer interposed therebetween. The liquid crystal display generates electric fields in the liquid crystal layer by applying voltage to the field generating electrodes, and determines the direction of liquid crystal molecules of the liquid crystal layer by the generated electric field, thus controlling polarization of incident light so as to display images.

The two sheets of display panels, which configure the liquid crystal display, may include a thin film transistor array panel, and an opposite display panel. On the thin film transistor array panel, a gate line configured to transmit a gate signal and a data line configured to transmit a data signal are formed to intersect each other, and a thin film transistor connected to the gate line and the data line, a pixel electrode connected to the thin film transistor, and the like may be formed. On the opposite display panel, a light blocking member, a color filter, a common electrode, and the like may be formed. In some cases, the light blocking member, the color filter, and the common electrode may be formed on the thin film transistor array panel.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

Embodiments have been made in an effort to provide a display device and a method of manufacturing a display device capable of reducing weight, thickness, costs, and a process time by manufacturing the display device using a single substrate.

In addition, embodiments provide a display device and a method of manufacturing a display device capable of preventing an alignment layer from being lumped in a microcavity.

One embodiment provides a display device including: a substrate; a thin film transistor formed on the substrate; a pixel electrode connected to the thin film transistor; a roof layer formed on the pixel electrode a plurality of microcavities interposed between the pixel electrode and the roof layer; an injection hole formed in the roof layer, the injection hole configured to expose at least a portion of the plurality of microcavities; a first valley extended in one direction between the plurality of microcavities; an alignment layer formed on the pixel electrode, under the roof layer, and in the first valley; a liquid crystal layer filled in the plurality of microcavities; and an encapsulation layer formed on the roof layer, the encapsulation layer configured to cover the injection hole and to seal the plurality of microcavities.

The plurality of microcavities may be disposed in the form of a matrix, and the first valley may be extended in a row direction between the plurality of microcavities, and may include a first odd valley in an odd row and a first even valley in an even row.

The alignment layer may be formed in one of the first odd valley or the first even valley, and may not be formed in the other one.

A thickness of a portion of the alignment layer positioned in the first valley may be larger than a thickness of a portion of the alignment layer positioned on the pixel electrode.

The thickness of the portion of the alignment layer positioned in the first valley may be larger than a thickness of the portion of the alignment layer positioned under the roof layer.

The alignment layer may be formed in the first odd valley and the first even valley.

A thickness of a portion of the alignment layer positioned in the first odd valley may be larger than a thickness of a portion of the alignment layer positioned in the first even valley.

The thickness of the portion of the alignment layer positioned in the first odd valley may be larger than a thickness of a portion of the alignment layer positioned on the pixel electrode.

The thickness of the portion of the alignment layer positioned on the pixel electrode may be larger than the thickness of the portion of the alignment layer positioned in the first even valley.

A surface of the first valley may have hydrophobicity, and surfaces on the pixel electrode and under the roof layer may have hydrophilicity.

Another embodiment provides a method of manufacturing a display device including: forming a thin film transistor on a substrate; forming a pixel electrode connected to the thin film transistor; forming a sacrificial layer on the pixel electrode; forming a roof layer on the sacrificial layer; forming an injection hole by patterning the roof layer so that a part of the sacrificial layer is exposed; forming a plurality of microcavities between the pixel electrode and the roof layer by removing the sacrificial layer, and forming a first valley extended in one direction between the plurality of microcavities; forming alignment layer on the pixel electrode, under the roof layer, and in the first valley by injecting an alignment agent through the injection hole; forming a liquid crystal layer in the plurality of microcavities by injecting a liquid crystal material through the injection hole; and sealing the plurality of microcavities by forming an encapsulation layer on the roof layer so as to cover the injection hole.

The plurality of microcavities may be disposed in the form of a matrix, and the first valley may be extended in a row direction between the plurality of microcavities, and may include a first odd valley in an odd row and a first even valley in an even row.

The method may further include performing a hydrophobic treatment of a surface of the first valley.

Performing the hydrophobic treatment of the surface of the first valley includes at least one of depositing a hydrophobic material on the substrate or etching using gas including fluorine.

Performing the hydrophobic treatment of the surface of the first valley includes a condition having high anisotropy.

The method may further include performing a hydrophilic treatment of an upper surface of the pixel electrode and a lower surface of the roof layer.

Performing the hydrophilic treatment of the upper surface of the pixel electrode and the lower surface of the roof layer may include a condition having high isotropy.

The alignment agent may be supplied to only one of the first odd valley or the first even valley.

The alignment agent may include an alignment material including a solid substance, and a solvent, where the solvent may evaporate and the alignment material may remain on the pixel electrode, under the roof layer, and in the first valley so as to form the alignment layer.

The alignment layer may be formed in one of the first odd valley or the first even valley, and a thickness of a portion of the alignment layer positioned in the first valley may be larger than a thickness of a portion of the alignment layer positioned on the pixel electrode.

The display device and the method of manufacturing of a display device may reduce weight, thickness, cost, and a process time by manufacturing the display device using a single substrate.

In addition, the alignment layer is formed in one of the first valley in the odd row and the first valley in the even row, or the alignment layer in the first valley in the odd row and the alignment layer in the first valley in the even row are formed to be asymmetric to each other, thereby preventing the alignment layer from being lumped in the microcavity.

DETAILED DESCRIPTION OF CERTAIN INVENTIVE EMBODIMENTS

Figure 1:
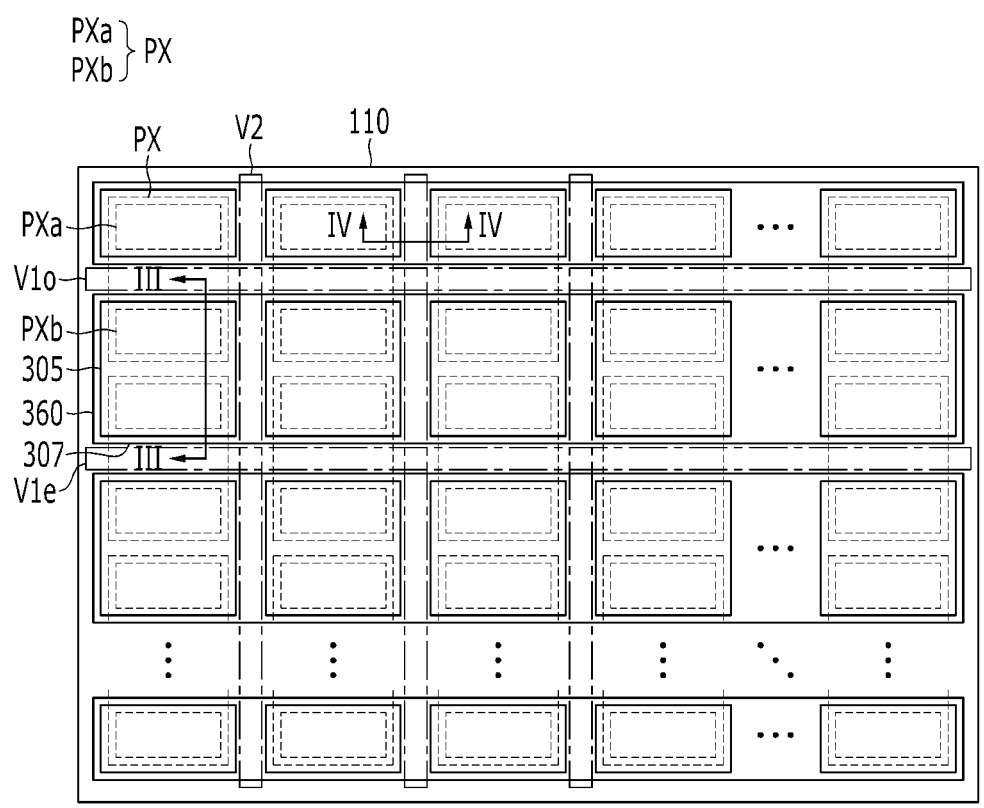
FIG. 1 is a top plan view illustrating a display device according to an embodiment.

The present invention will be described more fully hereinafter with reference to the accompanying drawings, in which certain embodiments of the invention are shown. As those skilled in the art would realize, the described embodiments may be modified in various ways, without departing from the spirit or scope of the present invention.

In the drawings, the thickness of layers, films, panels, regions, and the like, may be exaggerated for clarity. Like reference numerals generally designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In the liquid crystal display of the related art, because two substrates are essentially used, and respective constituent elements are formed on the two substrates, there are problems in that the display device is heavy and thick, manufacturing costs are high, and long periods of process time are needed.

A display device according to an embodiment will be schematically described with reference to the accompanying drawings.

FIG. 1 is a top plan view illustrating a display device according to an embodiment, and only a part of constituent elements are illustrated in FIG. 1, for convenience.

The display device a includes a substrate 110 made of a material such as, for example, glass or plastic, and a roof layer 360 formed on the substrate 110.

The substrate 110 includes a plurality of pixel areas PX. The plurality of pixel areas PX is disposed in the form of a matrix including a plurality of pixel rows, and a plurality of pixel columns. Each of the pixel areas PX may include a first sub-pixel area PXa, and a second sub-pixel area PXb. The first sub-pixel area PXa and the second sub-pixel area PXb may be disposed above and below one another.

A first valley V1 is positioned along a pixel row direction between the first sub-pixel area PXa and the second sub-pixel area PXb, and a second valley V2 is positioned between a plurality of pixel columns. The first valley V1 includes a first valley V1o in an odd row, and a first valley V1e in an even row.

The roof layer 360 is formed in the pixel row direction. An injection hole 307 is formed by removing the roof layer 360 in the first valley V1 so that constituent elements positioned under the roof layer 360 may be exposed to the outside.

Each of the roof layers 360 is formed between the adjacent second valleys V2 so as to be spaced apart from the substrate 110, such that a microcavity 305 is formed. The microcavity may be disposed in the form of a matrix. In addition, each of the roof layers 360 is formed in the second valley V2 so as to be attached to the substrate 110, such that both sides of the microcavity 305 are covered.

The aforementioned structure of the display device according to one embodiment is merely an example, and various modifications are possible. For example, the disposition forms of the pixel area PX, the first valley V1, and the second valley V2 may be changed, the plurality of roof layers 360 may also be connected to each other in the first valley V1, and a part of the roof layer 360 may be formed in the second valley V2 so as to be spaced apart from the substrate 110 such that the adjacent microcavities 305 may be connected to each other.

Next, one pixel of the display device according to an embodiment will be described with reference to FIGS. 1 to 4.

Figure 2:
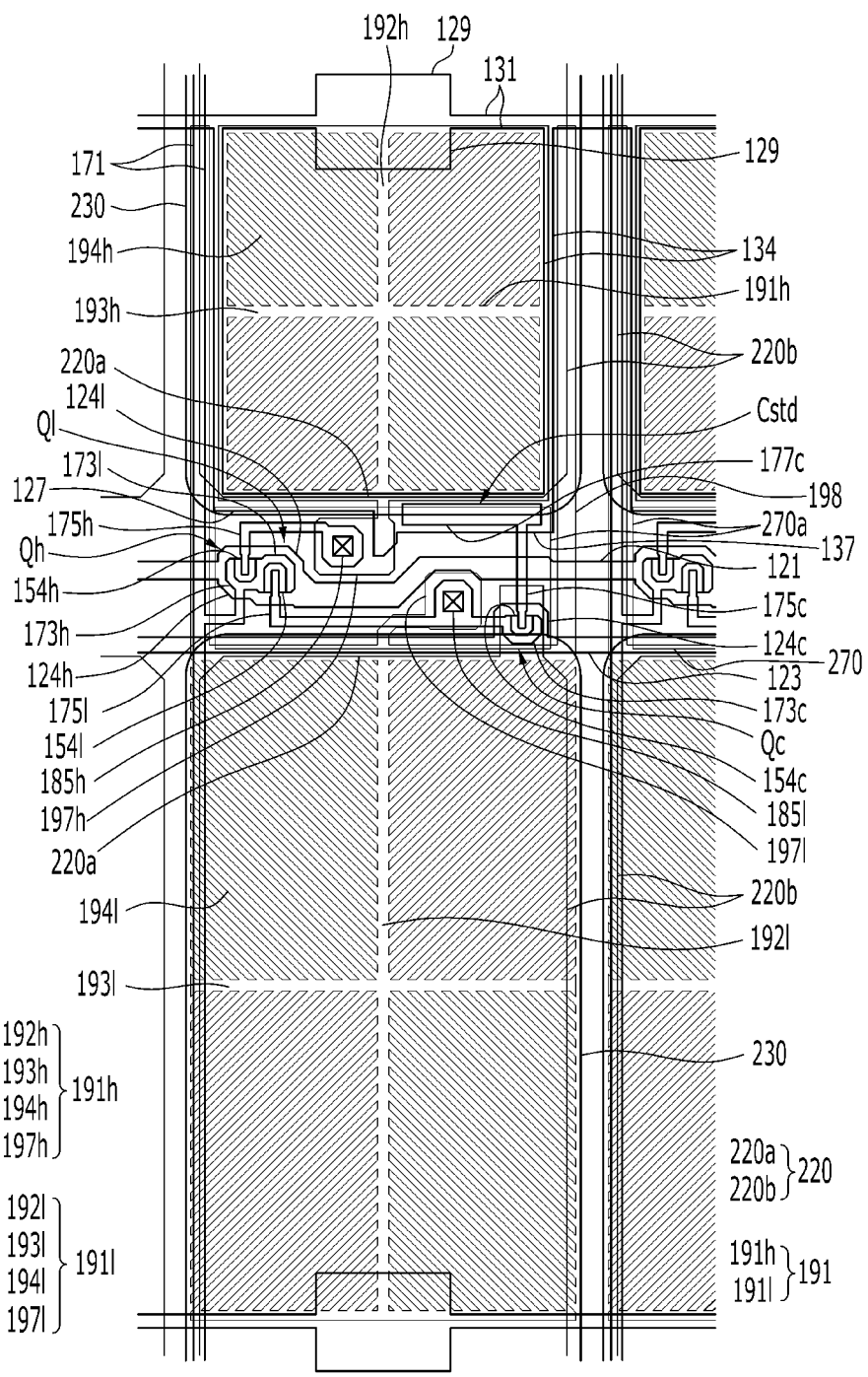
FIG. 2 is a top plan view illustrating one pixel of the display device according to an embodiment.
Figure 3:
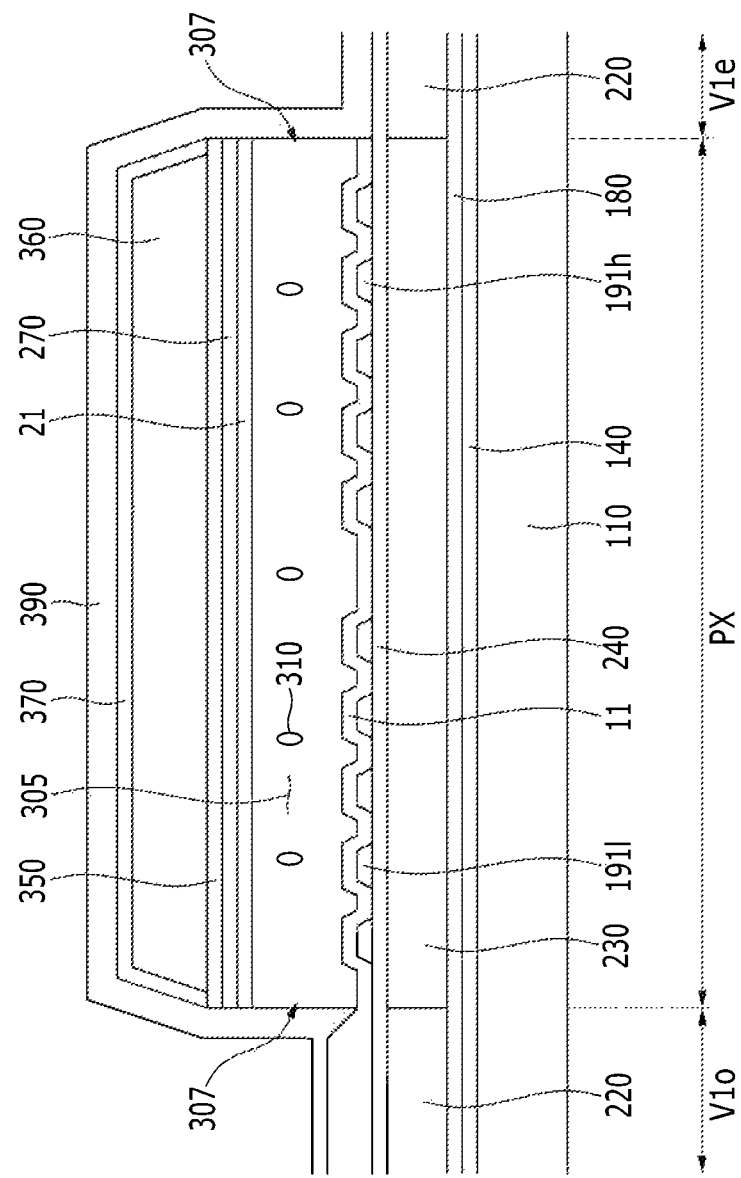
FIG. 3 is a cross-sectional view taken along line of FIG. 1 for illustrating a part of the display device according to an embodiment.
Figure 4:
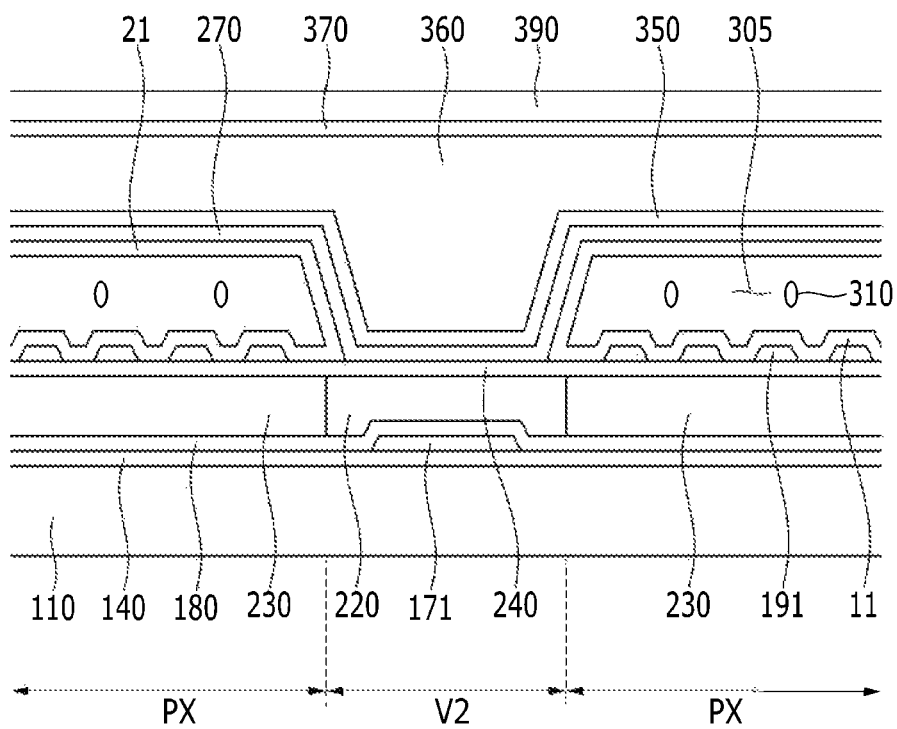
FIG. 4 is a cross-sectional view taken along line IV-IV of FIG. 1 for illustrating a part of the display device according to an embodiment.

FIG. 2 is a top plan view illustrating one pixel of the display device according to an embodiment, FIG. 3 is a cross-sectional view taken along line of FIG. 1 for illustrating a part of the display device according to an embodiment, and FIG. 4 is a cross-sectional view taken along line IV-IV of FIG. 1 for illustrating a part of the display device according to an embodiment.

Referring to FIGS. 1 to 4, a plurality of gate conductors including a plurality of gate lines 121, a plurality of step-down gate lines 123, and a plurality of storage electrode lines 131 are formed on the substrate 110.

The gate line 121 and the step-down gate line 123 are mainly extended in a horizontal direction and transmit gate signals. The gate conductor further includes a first gate electrode 124h and a second gate electrode 124l that protrude upward and downward from the gate line 121, and further includes a third gate electrode 124c that protrudes upward from the step-down gate line 123. The first gate electrode 124h and the second gate electrode 124l are connected to each other so as to form a single protruding portion. Shapes in which the first, second, and third gate electrodes 124h, 124l, and 124c protrude may be changed.

The storage electrode line 131 is also mainly extended in the horizontal direction, and transmits a predetermined voltage such as a common voltage Vcom. The storage electrode line 131 includes a storage electrode 129 that protrudes upward and downward, a pair of vertical portions 134 that is extended downward so as to be substantially vertical to the gate line 121, and a horizontal portion 127 that connects ends of the pair of vertical portions 134 to each other. The horizontal portion 127 includes a capacitor electrode 137 that is enlarged downward.

A gate insulating layer 140 is formed on the gate conductors 121, 123, 124h, 124l, 124c, and 131. The gate insulating layer 140 may be made of an inorganic insulating material such as, for example, a silicon nitride (SiNx), and a silicon oxide (SiOx). In addition, the gate insulating layer 140 may be formed as a single layer or as a multilayer.

A first semiconductor 154h, a second semiconductor 154l, and a third semiconductor 154c are formed on the gate insulating layer 140. The first semiconductor 154h may be positioned on the first gate electrode 124h, the second semiconductor 154l may be positioned on the second gate electrode 124l, and the third semiconductor 154c may be positioned on the third gate electrode 124c. The first semiconductor 154h and the second semiconductor 154l may be connected to each other, and the second semiconductor 154l and the third semiconductor 154c may also be connected to each other. In addition, the first semiconductor 154h may be formed to be extended to a lower side of the data line 171. The first to third semiconductors 154h, 154l, and 154c may be formed of, for example, amorphous silicon, polycrystalline silicon, metal oxide, or the like.

An ohmic contact (not illustrated) may be further formed on each of the first to third semiconductors 154h, 154l, and 154c. The ohmic contact may be made of a material such as, for example, n+ hydrogenated amorphous silicon into which silicide or n-type impurity is doped at high concentration.

Data conductors including a data line 171, a first source electrode 173h, a second source electrode 173l, a third source electrode 173c, a first drain electrode 175h, a second drain electrode 175l, and a third drain electrode 175c are formed on the first to third semiconductors 154h, 154l, and 154c.

The data line 171 transmits a data signal, and is mainly extended in a vertical direction so as to intersect the gate line 121 and the step-down gate line 123. Each of the data lines 171 includes the first source electrode 173h and the second source electrode 173l which are extended toward the first gate electrode 124h and the second gate electrode 124l, and are connected to each other.

The first drain electrode 175h, the second drain electrode 175l, and the third drain electrode 175c include one wide end portion, and another bar-shaped end portion. The bar shaped end portions of the first drain electrode 175h and the second drain electrode 175l are partially enclosed by the first source electrode 173h and the second source electrode 173l. The wide end portion of the second drain electrode 175l is extended again and forms the third source electrode 173c which is curved in a shape. A wide end portion 177c of the third drain electrode 175c is overlapped with the capacitor electrode 137 so as to form a step-down capacitor (Cstd), and the bar-shaped end portion thereof is partially enclosed by the third source electrode 173c.

The first gate electrode 124h, the first source electrode 173h, and the first drain electrode 175h form a first thin film transistor Qh together with the first semiconductor 154h. The second gate electrode 124l, the second source electrode 173l, and the second drain electrode 175l form a second thin film transistor Ql together with the second semiconductor 154l. The third gate electrode 124c, the third source electrode 173c, and the third drain electrode 175c form a third thin film transistor Qc together with the third semiconductor 154c.

The first semiconductor 154h, the second semiconductor 154l, and the third semiconductor 154c may be connected to each other so as to be formed in a linear shape, and may have substantially the same plane shape together with the data conductors 171, 173h, 173l, 173c, 175h, 175l, and 175c and the ohmic contacts under the data conductors 171, 173h, 173l, 173c, 175h, 175l, and 175c, except for channel regions between the source electrodes 173h, 173l, and 173c and the drain electrodes 175h, 175l, and 175c.

The first semiconductor 154h has an exposed portion which is not covered by the first source electrode 173h and the first drain electrode 175h between the first source electrode 173h and the first drain electrode 175h. The second semiconductor 154l has an exposed portion which is not covered by the second source electrode 173l and the second drain electrode 175l between the second source electrode 173l and the second drain electrode 175l. The third semiconductor 154c has an exposed portion which is not covered by the third source electrode 173c and the third drain electrode 175c between the third source electrode 173c and the third drain electrode 175c.

A passivation layer 180 is formed on the semiconductors 154h, 154l, and 154c which are exposed between the data conductors 171, 173h, 173l, 173c, 175h, 175l, and 175c and the respective source electrodes 173h, 173l, and 173c, and the respective drain electrodes 175h, 175l, and 175c. The passivation layer 180 may be made of an organic insulating material or an inorganic insulating material, and may be formed as a single layer or a multilayer.

A color filter 230 is formed on the passivation layer 180 in each of the pixel areas PX. Each of the color filters 230 may display, for example, one of the primary colors such as three primary colors of red, green, and blue. The color filter 230 may display colors of cyan, magenta, or yellow, white based colors, and the like without being limited to the three primary colors of red, green, and blue. Unlike the drawings, the color filter 230 may be elongated in a column direction along the adjacent data lines 171.

A light blocking member 220 is formed within a region between the adjacent color filters 230. The light blocking member 220 may be formed on a boundary portion of the pixel area PX and on the thin film transistor so as to prevent light leakage. The color filters 230 may be formed in the first sub-pixel area PXa and the second sub-pixel area PXb, respectively, and the light blocking member 220 may be formed between the first sub-pixel area PXa and the second sub-pixel area PXb.

The light blocking member 220 is extended and enlarged upward and downward along the gate line 121 and the step-down gate line 123, and includes a horizontal light blocking member 220a which covers a region where the first thin film transistor Qh, the second thin film transistor Ql, the third thin film transistor Qc, and the like are positioned, and a vertical light blocking member 220b which is extended along the data line 171. The horizontal light blocking member 220a may be formed in the first valley V1, and the vertical light blocking member 220b may be formed in the second valley V2. The color filter 230 and the light blocking member 220 may be overlapped with each other within a partial region.

A first insulating layer 240 may be further formed on the color filter 230 and the light blocking member 220. The first insulating layer 240 may be made of an inorganic insulating material such as, for example, a silicon nitride (SiNx), or a silicon oxide (SiOx). The first insulating layer 240 serves to protect the color filter 230 and the light blocking member 220 made of an organic material, and may be omitted as necessary.

A plurality of first contact holes 185h and a plurality of second contact holes 185l are formed in the first insulating layer 240, the light blocking member 220, and the passivation layer 180 so as to expose the wide end portion of the first drain electrode 175h, and the wide end portion of the second drain electrode 175l, respectively.

A pixel electrode 191 is formed on the first insulating layer 240. The pixel electrode 191 may be made of a transparent metallic material such as, for example, an indium-tin oxide (ITO), and an indium-zinc oxide (IZO).

The pixel electrode 191 includes a first sub-pixel electrode 191h and a second sub-pixel electrode 191l which are separated from each other while interposing the gate line 121 and the step-down gate line 123 therebetween, disposed on and under the pixel area PX on the basis of the gate line 121 and the step-down gate line 123, and adjacent to each other in a column direction. The first sub-pixel electrode 191h and the second sub-pixel electrode 191l are separated from each other while interposing the first valley V1 therebetween, the first sub-pixel electrode 191h is positioned in the first sub-pixel area PXa, and the second sub-pixel electrode 191l is positioned in the second sub-pixel area PXb.

The first sub-pixel electrode 191h and the second sub-pixel electrode 191l are connected to the first drain electrode 175h and the second drain electrode 175l through the first contact hole 185h and the second contact hole 185l, respectively. Therefore, in a state in which the first thin film transistor Qh and the second thin film transistor Ql are turned on, a data voltage is applied from the first drain electrode 175h and the second drain electrode 175l.

Each of the first sub-pixel electrode 191h and the second sub-pixel electrode 191l is a quadrangular shape, and each of the first sub-pixel electrode 191h and the second sub-pixel electrode 191l includes a cross-shaped stem portion having horizontal stem portions 193h and 193l, and vertical stem portions 192h and 192l which intersect the horizontal stem portions 193h and 193l. In addition, the first sub-pixel electrode 191h and the second sub-pixel electrode 191l include protruding portions 197h and 197l which protrude downward or upward from edge sides of a plurality of minute branch portions 194h and 194l, and the sub-pixel electrodes 191h and 191l, respectively.

The pixel electrode 191 is divided into four sub-regions by the horizontal stem portions 193h and 193l and the vertical stem portions 192h and 192l. The minute branch portions 194h and 194l are obliquely extended from the horizontal stem portions 193h and 193l and the vertical stem portions 192h and 192l, and the extension direction may form an angle of approximately 45° or 135° with the gate line 121 or the horizontal stem portions 193h and 193l. In addition, the directions in which the minute branch portions 194h and 194l of two adjacent sub-regions are extended may be orthogonal to each other.

In one embodiment, the first sub-pixel electrode 191h further includes an outline stem portion which encloses an outline, and the second sub-pixel electrode 191l further includes horizontal portions positioned at an upper end and a lower end, and left and right vertical portions 198 positioned at a left and right sides of the first sub-pixel electrode 191h. The left and right vertical portions 198 may prevent a capacitive coupling between the data line 171 and the first sub-pixel electrode 191h.

The disposition forms of the pixel area, the structure of the thin film transistor, and the shape of the pixel electrode, which are described above, are merely examples, and various modifications are possible.

A common electrode 270 is formed on the pixel electrode 191 so as to be spaced apart from the pixel electrode 191 at a predetermined distance. The microcavity 305 is formed between the pixel electrode 191 and the common electrode 270. The microcavity 305 is enclosed by the pixel electrode 191 and the common electrode 270. A width and an area of the microcavity 305 may be variously changed in accordance with a size and a resolution of the display device.

The common electrode 270 may be made of a transparent metallic material such as, for example, an indium-tin oxide (ITO), or an indium-zinc oxide (IZO). A predetermined voltage may be applied to the common electrode 270, and an electric field may be formed between the pixel electrode 191 and the common electrode 270.

A first alignment layer 11 is formed on the pixel electrode 191 and in the first valley V1. The first alignment layer 11 may be formed directly on the first insulating layer 240 in the first valley V1. An upper surface of the pixel electrode 191 has hydrophilicity, and a surface of the first insulating layer 240 positioned in the first valley V1 has hydrophobicity.

The first alignment layer 11 may be formed within only a partial region of the first valley V1. The first alignment layer 11 may be formed in one of the first valley V1o or the first valley V1e, but may not be formed in the other one. For example, the first alignment layer 11 may be formed in the first valley V1o in the odd row, but may not be formed in the first valley V1e in the even row. In contrast, the first alignment layer 11 may be formed in the first valley V1e in the even row, but may not be formed in the first valley V1o in the odd row.

In a case in which the first alignment layer 11 is formed in the first valley V1o in the odd row, a thickness of a portion of the first alignment layer 11 positioned in the first valley V1o in the odd row is formed to be larger than a thickness of a portion of the first alignment layer 11 positioned on the pixel electrode 191.

A second alignment layer 21 is formed under the roof layer 360 so as to face the first alignment layer 11. In a case in which the common electrode 270 is positioned under the roof layer 360, the second alignment layer 21 is positioned under the common electrode 270.

The thickness of the first alignment layer 11 positioned on the pixel electrode 191 is almost the same as a thickness of the second alignment layer 21 positioned under the roof layer 360. Therefore, the thickness of the portion of the first alignment layer 11 positioned in the first valley V1o in the odd row is formed to be larger than the thickness of the second alignment layer 21 positioned under the roof layer 360.

While the case in which the first alignment layer 11 is formed in one of the first valley V1o in the odd row and the first valley V1e in the even row has been described above, in some embodiments, the first alignment layer 11 may be formed in the first valley V1o in the odd row and the first valley V1e in the even row.

The thickness of the portion of the first alignment layer 11 positioned in the first valley V1o in the odd row is formed to be larger than the thickness of a portion of the first alignment layer 11 positioned in the first valley V1e in the even row.

The thickness of the portion of the first alignment layer 11 positioned in the first valley V1o in the odd row is formed to be larger than the thickness of the portion of the first alignment layer 11 positioned on the pixel electrode 191. In addition, the thickness of the portion of the first alignment layer 11 positioned on the pixel electrode 191 is formed to be larger than the thickness of the portion of the first alignment layer 11 positioned in the first valley V1e in the even row.

The thickness of the portion of the first alignment layer 11 positioned in the first valley V1o in the odd row is formed to be larger than the thickness of the second alignment layer 21 positioned under the roof layer 360.

The first alignment layer 11 and the second alignment layer 21 may be formed as a vertical alignment layer, and made of an alignment material such as, for example, polyamic acid, polysiloxane, or polyimide. The first and second alignment layers 11 and 21 may be connected to each other at an edge of the pixel area PX.

A liquid crystal layer, which is formed of liquid crystal molecules 310, is formed in the microcavity 305 positioned between the pixel electrode 191 and the common electrode 270. The liquid crystal molecules 310 have negative dielectric anisotropy, and may stand on the substrate 110 in a vertical direction in a state in which an electric field is not applied. Vertical alignment may be formed.

The first sub-pixel electrode 191h and the second sub-pixel electrode 191l, to which a data voltage is applied, produce an electric field together with the common electrode 270, such that a direction of the liquid crystal molecule 310 positioned in the microcavity 305 between the two electrodes 191 and 270 is determined. In accordance with the direction of the liquid crystal molecule 310, which is determined as described above, luminance of a light, which passes through the liquid crystal layer, is varied.

A second insulating layer 350 may be further formed on the common electrode 270. The second insulating layer 350 may be made of an inorganic insulating material such as, for example, a silicon nitride (SiNx), or a silicon oxide (SiOx), and may be omitted as necessary.

The roof layer 360 is formed on the second insulating layer 350. The roof layer 360 may be made of an organic material. The microcavity 305 is formed under the roof layer 360. The roof layer 360 may become hard by a curing process so as to maintain a shape of the microcavity 305. The roof layer 360 is formed to be spaced apart from the pixel electrode 191 while interposing the microcavity 305 therebetween.

The roof layer 360 is formed along the pixel row in each of the pixel areas PX and at each of the second valleys V2, but is not formed in the first valley V1. The roof layer 360 is not formed between the first sub-pixel area PXa and the second sub-pixel area PXb. In each of the first sub-pixel area PXa and the second sub-pixel area PXb, the microcavities 305 are formed under the roof layers 360, respectively. The microcavity 305 is not formed under the roof layer 360 in the second valley V2, but the roof layer 360 is formed to be attached to the substrate 110. Therefore, a thickness of the roof layer 360 positioned in the second valley V2 may be formed to be larger than a thickness of the roof layer 360 positioned in each of the first sub-pixel area PXa and the second sub-pixel area PXb. The microcavity 305 has a form in which an upper surface and both side surfaces thereof are covered by the roof layer 360.

Injection holes 307, which expose a part of the microcavity 305, are formed in the roof layer 360. The injection holes 307 may be formed at edges of the first sub-pixel area PXa and the second sub-pixel area PXb so as to face each other. The injection holes 307 may be formed to expose sides of the microcavity 305 so as to correspond to a lower side of the first sub-pixel area PXa and an upper side of the second sub-pixel area PXb. The microcavity 305 is exposed by the injection holes 307 such that an alignment agent, a liquid crystal material, or the like may be injected into the microcavity 305 through the injection holes 307.

A third insulating layer 370 may be further formed on the roof layer 360. The third insulating layer 370 may be made of an inorganic insulating material such as, for example, silicon nitride (SiNx), or silicon oxide (SiOx). The third insulating layer 370 may be formed to cover an upper surface and side surfaces of the roof layer 360. The third insulating layer 370 serves to protect the roof layer 360 made of an organic material, and may be omitted as necessary.

An encapsulation layer 390 may be formed on the third insulating layer 370. The encapsulation layer 390 is formed to cover the injection holes 307 which expose a part of the microcavity 305 to the outside. The encapsulation layer 390 may seal the microcavity 305 so that the liquid crystal molecule 310, which is formed in the microcavity 305, is not moved to the outside. Because the encapsulation layer 390 comes into contact with the liquid crystal molecules 310, the encapsulation layer 390 may be made of a material that does not react with the liquid crystal molecules 310. For example, the encapsulation layer 390 may be made of parylene or the like.

The encapsulation layer 390 may be formed as a multilayer such as a double layer, or a triple layer. The double layer includes two layers made of different materials. The triple layer includes three layers, and materials of the adjacent layers are different from each other. For example, the encapsulation layer 390 may include a layer made of an organic insulating material, and a layer made of an inorganic insulating material.

Although not illustrated, polarizers may be further formed on upper and lower surfaces of the display device. The polarizer may include a first polarizer, and a second polarizer. The first polarizer may be attached to a lower surface of the substrate 110, and the second polarizer may be attached on the encapsulation layer 390.

Next, a method of manufacturing a display device according to an embodiment will be described with reference to FIGS. 5 to 10. Moreover, the method will be described with reference to FIGS. 1 to 4.

FIGS. 5 to 10 are process cross-sectional views illustrating a method of manufacturing a display device according to an embodiment.

Figure 5:
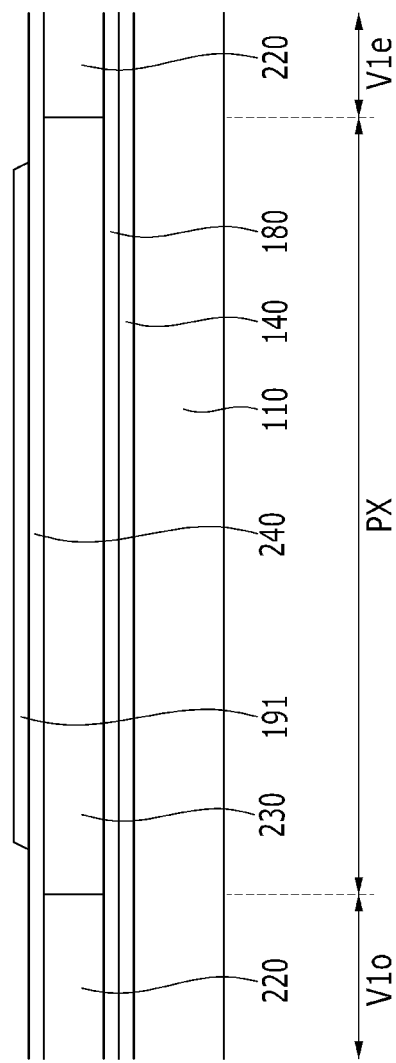
FIGS. 5 to 10 are process cross-sectional views illustrating a method of manufacturing a display device according to an embodiment.

First, as illustrated in FIG. 5, the gate line 121 and the step-down gate line 123, which are extended in one direction, are formed on the substrate 110 made of glass, plastic, or the like, and then the first gate electrode 124h, the second gate electrode 124l, and the third gate electrode 124c, which protrude from the gate line 121, are formed.

In addition, the storage electrode line 131 may be also be formed so as to be spaced apart from the gate line 121, the step-down gate line 123, and the first to third gate electrodes 124h, 124l, and 124c.

Next, using an inorganic insulating material such as, for example, a silicon oxide (SiOx), or a silicon nitride (SiNx), the gate insulating layer 140 is formed on the entire surface of the substrate 110 including the gate line 121, the step-down gate line 123, the first to third gate electrodes 124h, 124l, and 124c, and the storage electrode line 131. The gate insulating layer 140 may be formed as a single layer, or a multilayer.

Next, a semiconductor material such as, for example, an amorphous silicon, a polycrystalline silicon, or a metal oxide is deposited on the gate insulating layer 140, and thereafter, the deposited semiconductor material is patterned to form the first semiconductor 154h, the second semiconductor 154l, and the third semiconductor 154c. The first semiconductor 154h may be formed to be positioned on the first gate electrode 124h, the second semiconductor 154l may be formed to be positioned on the second gate electrode 124l, and the third semiconductor 154c may be formed to be positioned on the third gate electrode 124c.

Next, a metallic material is deposited and patterned so as to form the data line 171 that is extended in the other direction. The metallic material may be formed as a single layer, or a multilayer.

In addition, the first source electrode 173h which protrudes on the first gate electrode 124h from the data line 171, and the first drain electrode 175h which is spaced apart from the first source electrode 173h are formed together. In addition, the second source electrode 173l which is connected to the first source electrode 173h, and the second drain electrode 175l which is spaced apart from the second source electrode 173l are formed together. In addition, the third source electrode 173c which is extended from the second drain electrode 175l, and the third drain electrode 175c which is spaced apart from the third source electrode 173c are formed together.

The semiconductor material and the metal material may be continuously deposited and simultaneously patterned so as to form the first to third semiconductors 154h, 154l, and 154c, the data line 171, the first to third source electrodes 173h, 173l, and 173c, and the first to third drain electrodes 175h, 175l, and 175c. The first semiconductor 154h is formed to be extended to a lower side of the data line 171.

The first, second, and third gate electrodes 124h, 124l, and 124c, the first, second, and third source electrodes 173h, 173l, and 173c, and the first, second, and third drain electrodes 175h, 175l, and 175c configure the first, second, and third thin film transistors (TFTs) Qh, Ql, and Qc, respectively, together with the first, second, and third semiconductors 154h, 154l, and 154c.

Next, the passivation layer 180 is formed on the data line 171, the first to third source electrodes 173h, 173l, and 173c, the first to third drain electrodes 175h, 175l, and 175c, and the semiconductors 154h, 154l, and 154c that are exposed between the respective source electrodes 173h, 173l, and 173c and the respective drain electrodes 175h, 175l, and 175c. The passivation layer 180 may be made of an organic insulating material, or an inorganic insulating material, and may be formed as a single layer, or a multilayer.

Next, the color filter 230 is formed in each of the pixel areas PX on the passivation layer 180. The color filter 230 is formed in each of the first sub-pixel area PXa and the second sub-pixel area PXb, but may not be formed in the first valley V1. In addition, the color filters 230 having the same color may be formed along a column direction of the plurality of pixel areas PX. In a case in which the color filters 230 having three colors are formed, the color filter 230 having a first color is formed first, and then the color filter 230 having a second color may be formed by shifting a mask. Next, after the color filter 230 having the second color is formed, the color filter having a third color may be formed by shifting the mask again.

Next, the light blocking member 220 is formed on the boundary portion and the thin film transistor in each of the pixel area PX on the passivation layer 180. The light blocking member 220 may be formed even in the first valley V1 positioned between the first sub-pixel area PXa and the second sub-pixel area PXb.

While the process in which the color filter 230 is formed, and then the light blocking member 220 is formed has been described above, in some embodiments, the light blocking member 220 may be formed first, and then the color filter 230 may be formed.

Next, with an inorganic insulating material such as, for example, a silicon nitride (SiNx), and a silicon oxide (SiOx), the first insulating layer 240 is formed on the color filter 230 and the light blocking member 220.

Next, the passivation layer 180, the light blocking member 220, and the first insulating layer 240 are etched, such that the first contact hole 185h is formed so that a part of the first drain electrode 175h is exposed, and the second contact hole 185l is formed so that a part of the second drain electrode 175l is exposed.

Next, a transparent metallic material such as, for example, an indium-tin oxide (ITO), or an indium-zinc oxide (IZO) is deposited and patterned on the first insulating layer 240, such that the first sub-pixel electrode 191h is formed in the first sub-pixel area PXa, and the second sub-pixel electrode 191l is formed in the second sub-pixel area PXb. The first sub-pixel electrode 191h and the second sub-pixel electrode 191l are separated from each other while interposing the first valley V1 therebetween. The first sub-pixel electrode 191h is formed to be connected to the first drain electrode 175h through the first contact hole 185h, and the second sub-pixel electrode 191l is formed to be connected to the second drain electrode 175l through the second contact hole 185l.

The horizontal stem portions 193h and 193l (not shown), and the vertical stem portions 192h and 192l (not shown), which intersect the horizontal stem portions 193h and 193l, are formed in the first sub-pixel electrode 191h and the second sub-pixel electrode 191l, respectively. In addition, the plurality of minute branch portions 194h and 194l (not shown), which is obliquely extended from the horizontal stem portions 193h and 193l and the vertical stem portions 192h and 192l, is formed.

Figure 6:
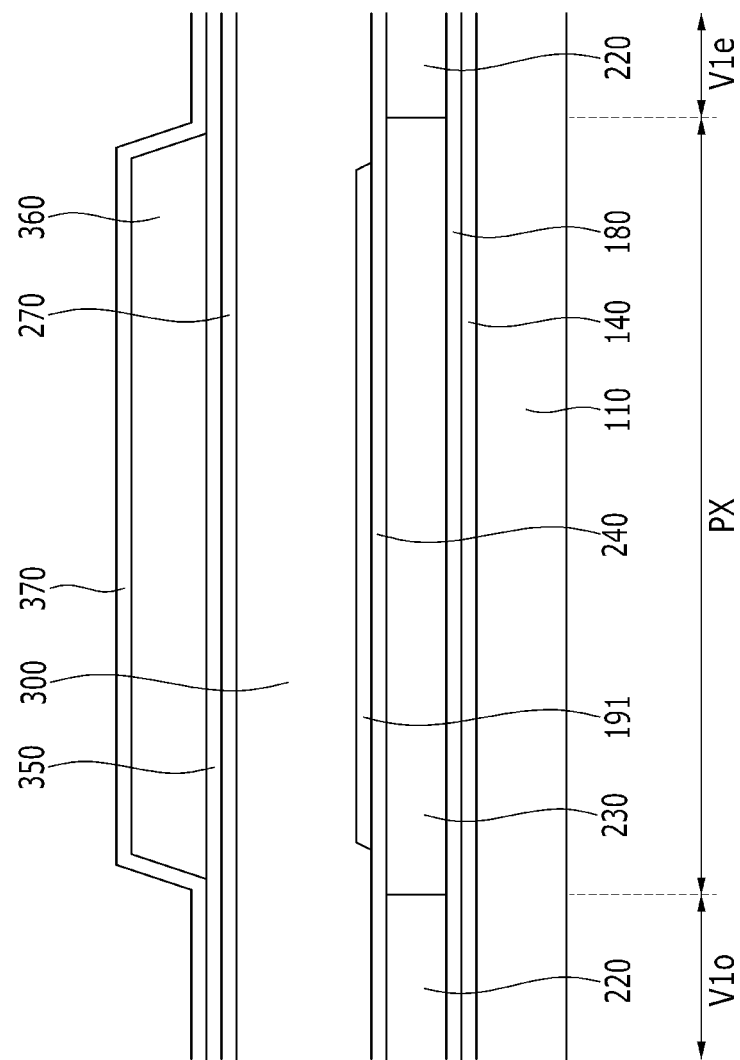

As illustrated in FIG. 6, a photosensitive organic material is applied on the pixel electrode 191, and a sacrificial layer 300 is formed by a photo process.

The sacrificial layer 300 is formed to be connected along the plurality of pixel columns. The sacrificial layer 300 is formed to cover each of the pixel areas PX, and formed to cover the first valley V1 positioned between the first sub-pixel area PXa and the second sub-pixel area PXb.

Next, a transparent metallic material such as an indium-tin oxide (ITO), or an indium-zinc oxide (IZO) is deposited on the sacrificial layer 300 so as to form the common electrode 270.

Next, with an inorganic insulating material such as a silicon oxide, or a silicon nitride, the second insulating layer 350 may be formed on the common electrode 270.

Next, an organic material is applied and patterned on the second insulating layer 350 so as to form the roof layer 360. Here, the organic material may be patterned so that the organic material positioned in the first valley V1 is removed. Accordingly, the roof layer 360 has a form in which the roof layer 360 is connected along the plurality of pixel rows.

Next, with an inorganic insulating material such as, for example, a silicon nitride (SiNx), or a silicon oxide (SiOx), the third insulating layer 370 may be formed on the roof layer 360. The third insulating layer 370 may be formed on the patterned roof layer 360 so as to cover and protect sides of the roof layer 360.

Figure 7:
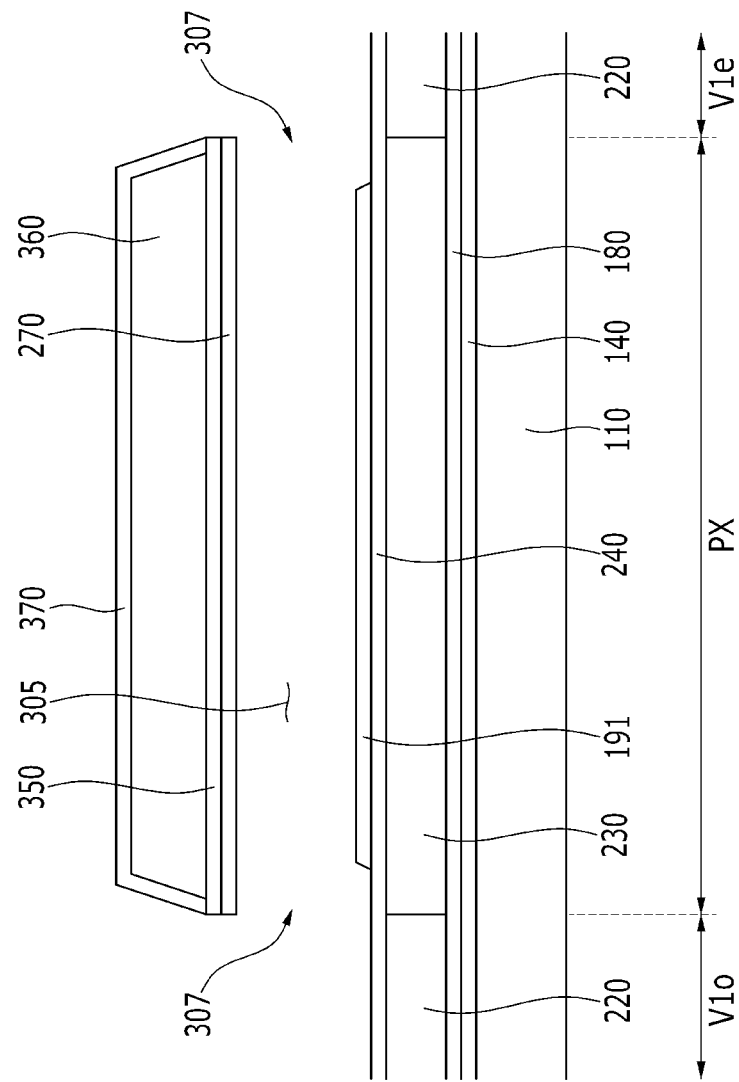

As illustrated in FIG. 7, the third insulating layer 370, the second insulating layer 350, and the common electrode 270 are patterned to remove the third insulating layer 370, the second insulating layer 350, and the common electrode 270 that are positioned in the first valley V1.

The roof layer 360 and the common electrode 270 are patterned such that the sacrificial layer 300 positioned in the first valley V1 is exposed to the outside.

Next, the entire sacrificial layer 300 is removed by supplying a developer, a stripper solution, or the like on the substrate 110 where the sacrificial layer 300 is exposed, or the entire sacrificial layer 300 is removed using an ashing process.

When the sacrificial layer 300 is removed, the microcavity 305 is formed at a place where the sacrificial layer 300 was positioned.

The pixel electrode 191 and the common electrode 270 are spaced apart from each other while interposing the microcavity 305 therebetween, and the pixel electrode 191 and the roof layer 360 are spaced apart from each other while interposing the microcavity 305 therebetween. The common electrode 270 and the roof layer 360 are formed to cover the upper surface and both side surfaces of the microcavity 305.

The microcavity 305 is exposed to the outside through portions where the roof layer 360 and the common electrode 270 are removed, and the portions are referred to as the liquid crystal injection holes 307. The liquid crystal injection holes 307 are formed along the first valley V1. For example, the injection holes 307 may be formed to face each other at the edges of the first sub-pixel area PXa and the second sub-pixel area PXb. The injection hole 307 may be formed to expose the sides of the microcavity 305 so as to correspond to the lower side of the first sub-pixel area PXa and the upper side of the second sub-pixel area PXb. Unlike the above configuration, the liquid crystal injection hole 307 may also be formed along the second valley V2.

Next, the roof layer 360 is cured by heating the substrate 110. This is to allow a shape of the microcavity 305 to be maintained by the roof layer 360.

Figure 8:
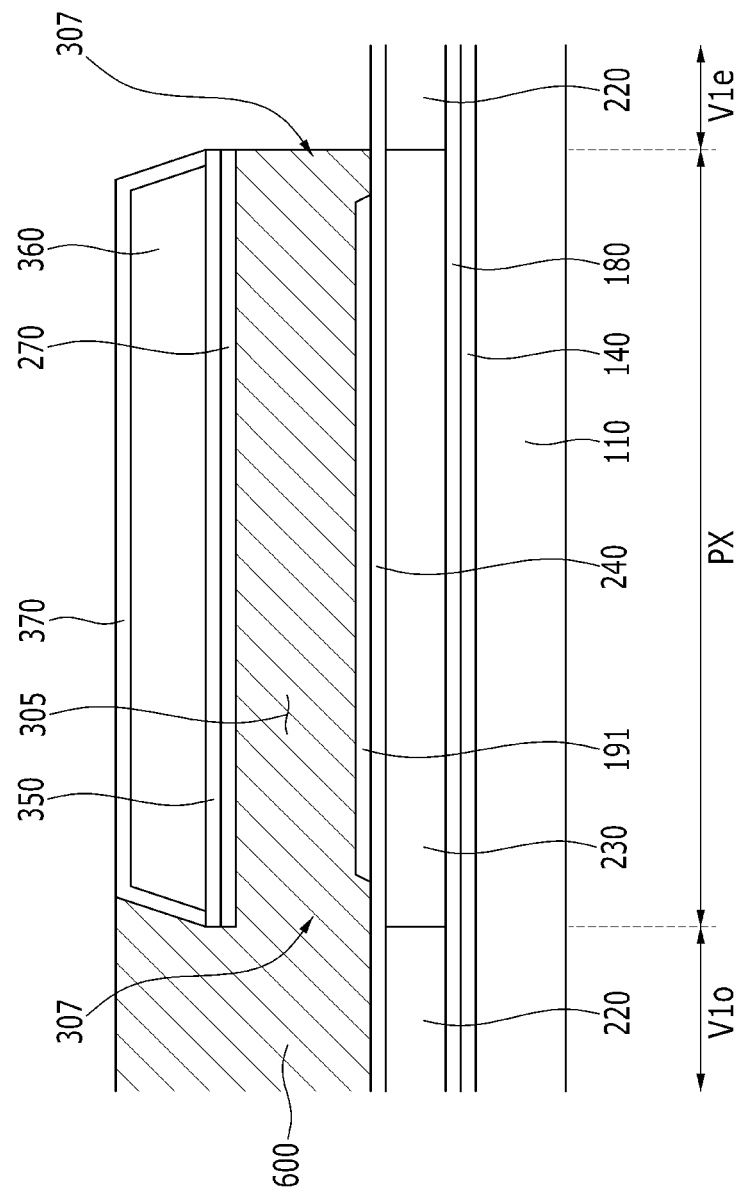

As illustrated in FIG. 8, when an alignment agent 600 including an alignment material is dropped on the substrate 110, the alignment agent 600 is injected into the microcavity 305 through the injection holes 307.

The alignment agent 600 is supplied to one of the first valley V1o in the odd row and the first valley V1e in the even row, but is not supplied to the other one. For example, in a case in which the alignment agent 600 is supplied to the first valley V1o in the odd row, but is not supplied to the first valley V1e in the even row, the alignment agent 600 is formed in the pixel area PX and the first valley V1o in the odd row, as illustrated. The alignment agent 600 is supplied so that an interior of the microcavity 305 is fully filled with the alignment agent 600, and a level of the alignment agent 600 reaches a height of the roof layer 360 at the first valley V1o in the odd row.

An upper surface of the pixel electrode 191 and a lower surface of the roof layer 360 in the pixel area PX are hydrophilically treated. The alignment agent 600 is made of a hydrophilic material, and thus is easily injected into the hydrophilically treated microcavity 305.

A surface of the first valley V1 is hydrophobically treated. The alignment agent 600 is supplied to the first valley V1o in the odd row so as to be injected into the microcavity 305, but does not reach the first valley V1e in the even row. Therefore, a level of the alignment agent 600 in the first valley V1o in the odd row and a level of the alignment agent 600 in the first valley V1e in the even row are asymmetric to each other.

While the case in which the alignment agent 600 is supplied to the first valley V1o in the odd row, but is not supplied to the first valley V1e in the even row has been described above, in some embodiments, the alignment agent 600 may be supplied to the first valley V1e in the even row, but may not be supplied to the first valley V1o in the odd row.

In addition, while the configuration in which the alignment agent 600 does not absolutely reach the first valley V1e in the even row in a case in which the alignment agent 600 is supplied only to the first valley V1o in the odd row, as illustrated, has been described above, in some embodiments, a part of the alignment agent 600, which is injected into the microcavity 305, may reach the first valley V1e in the even row. However, because the first valley V1 is hydrophobically treated, an amount of the alignment agent 600, which is positioned in the first valley V1e in the even row, is just small.

Figure 9:
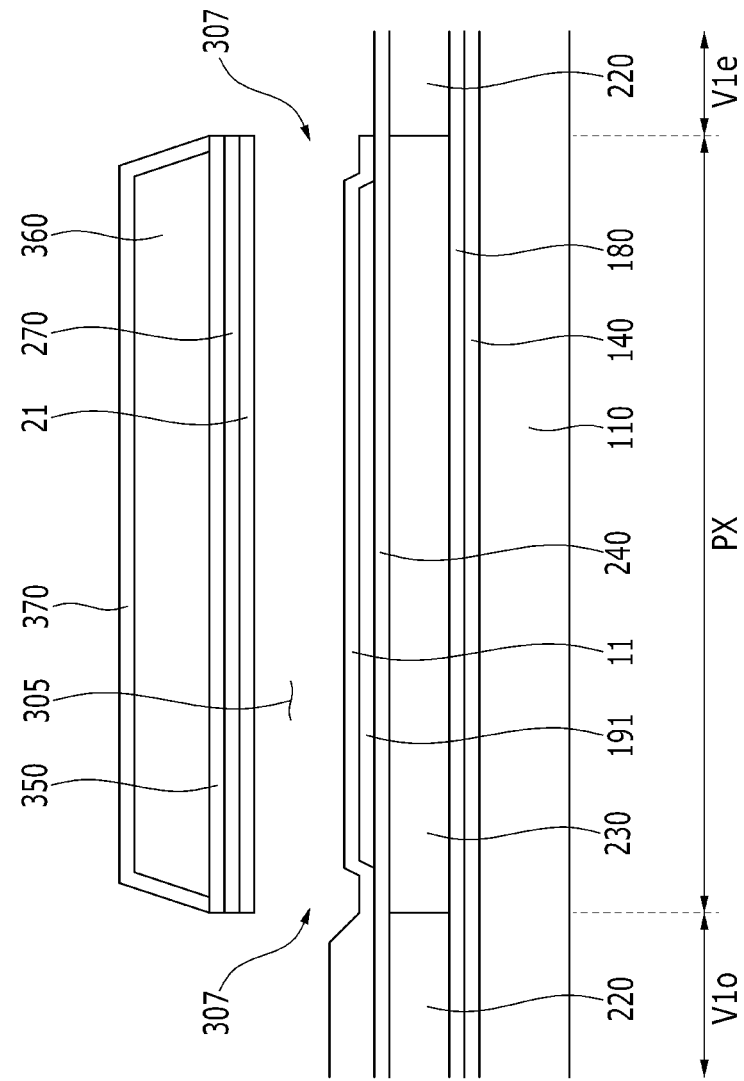

As illustrated in FIG. 9, when the alignment agent 600 is injected into the microcavity 305, and thereafter, a curing process is progressed, a solvent substance evaporates, and an alignment material remains on wall surfaces in the microcavity 305 and the odd numbered first valley V1o.

Therefore, the first alignment layer 11 may be formed on the pixel electrode 191 and in the first valley V1, and the second alignment layer 21 may be formed under the roof layer 360. The first alignment layer 11 and the second alignment layer 21 are formed to face each other while interposing the microcavity 305 therebetween, and formed to be connected to each other at the edge of the pixel area PX.

The first and second alignment layers 11 and 21 may be aligned in the vertical direction to the substrate 110 except for the sides of the microcavity 305. A process of irradiating an UV to the first and second alignment layers 11 and 21 is additionally performed so that the first and second alignment layers 11 and 21 may be aligned in the horizontal direction to the substrate 110.

The thickness of the portion of the first alignment layer 11 positioned in the first valley V1o in the odd row is formed to be larger than the thickness of the portion of the first alignment layer 11 positioned on the pixel electrode 191. In addition, the thickness of the portion of the first alignment layer 11 positioned in the first valley V1o in the odd row is formed to be larger than the thickness of the second alignment layer 21 positioned under the roof layer 360.

In addition, in a case in which a small amount of the alignment agent 600 reaches the first valley V1e in the even row, the thickness of the portion of the first alignment layer 11 positioned in the first valley V1o in the odd row is formed to be larger than the thickness of the portion of the first alignment layer 11 positioned in the first valley V1e in the even row. In addition, the thickness of the portion of the first alignment layer 11 positioned on the pixel electrode 191 is formed to be larger than the thickness of the portion of the first alignment layer 11 positioned in the first valley V1e in the even row.

Figure 10:
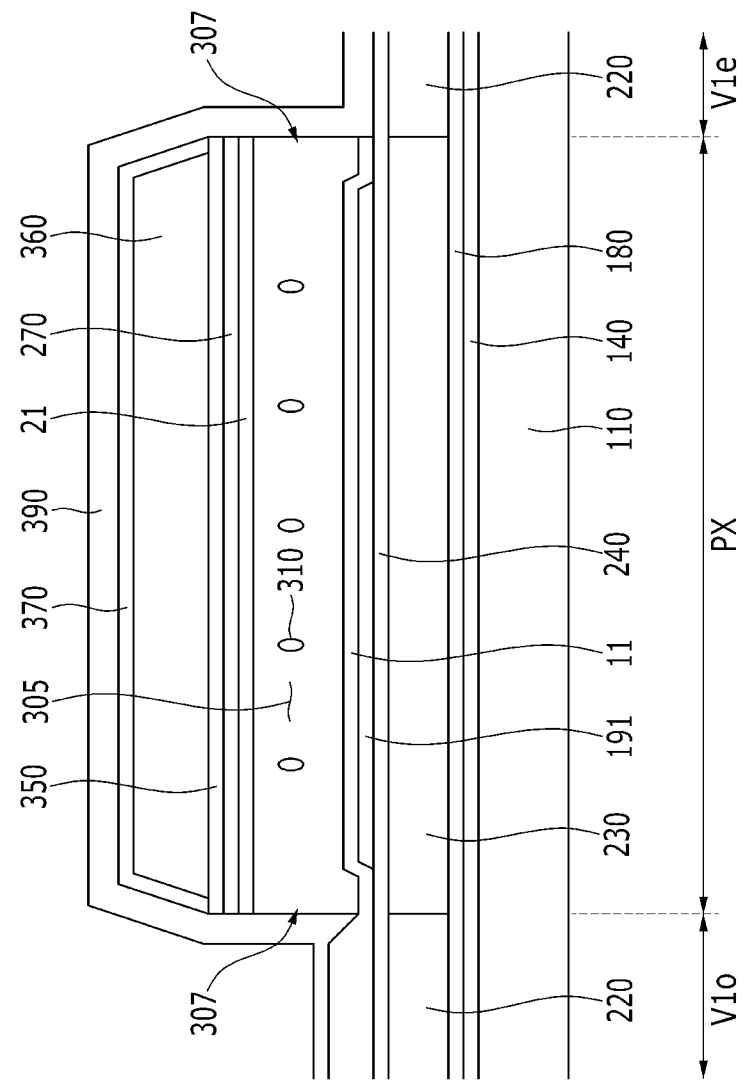

As illustrated in FIG. 10, when a liquid crystal material is dropped on the substrate 110 in an inkjet manner or a dispensing manner, the liquid crystal material is injected into the microcavity 305 through the injection holes 307. At this time, the liquid crystal material may be dropped into the injection hole 307 formed along the odd numbered first valley V1, but may not be dropped into the injection hole 307 formed along the even numbered first valley V1. In contrast, the liquid crystal material may be dropped into the injection hole 307 formed along the even numbered first valley V1, but may not be dropped into the injection hole 307 formed along the odd numbered first valley V1.

When the liquid crystal material is dropped into the liquid crystal injection holes 307 formed along the odd numbered first valley V1, the liquid crystal material is moved into the microcavity 305 through the liquid crystal injection holes 307 by capillary force. At this time, air in the microcavity 305 is moved out through the liquid crystal injection holes 307 formed along the even numbered first valley V1 such that the liquid crystal material is moved into the microcavity 305.

In addition, the liquid crystal material may be dropped into all of the liquid crystal injection holes 307. The liquid crystal material may be dropped into both the injection holes 307 formed along the odd numbered first valley V1 and the injection holes 307 formed along the even numbered first valley V1.

Next, the encapsulation layer 390 is formed on the third insulating layer 370 by depositing a material that does not react with the liquid crystal molecules 310. The encapsulation layer 390 is formed so that the microcavity 305 covers the liquid crystal injection holes 307 which is exposed to the outside, and seals the microcavity 305.

Next, although not illustrated, the polarizers may be further attached to the upper and lower surfaces of the display device. The polarizers may include the first polarizer and the second polarizer. The first polarizer may be attached to the lower surface of the substrate 110, and the second polarizer may be attached on the encapsulation layer 390.

Next, a process for forming the alignment layer will be further described with reference to FIGS. 11 to 21.

FIGS. 11 to 21 are process cross-sectional views illustrating a process of forming the alignment layer in the method of manufacturing a display device according to an embodiment of the present invention. For convenience, in FIGS. 11 to 21, the process of forming the alignment layer is illustrated on the basis of the substrate 110 and the roof layer 360, and constituent elements such as the first insulating layer, the pixel electrode, and the common electrode are omitted.

Figure 11:
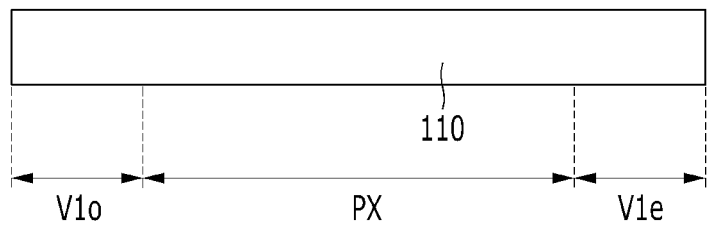
FIGS. 11 to 21 are process cross-sectional views illustrating a process of forming an alignment layer in the method of manufacturing a display device according to an embodiment.

First, as illustrated in FIG. 11, the microcavity 305 is formed under the roof layer 360, and thereafter, a hydrophilic treatment process is performed on the substrate 110. The hydrophilic treatment may use a method of depositing a hydrophilic material, or may use a method of etching using gas including oxygen.

Figure 12:
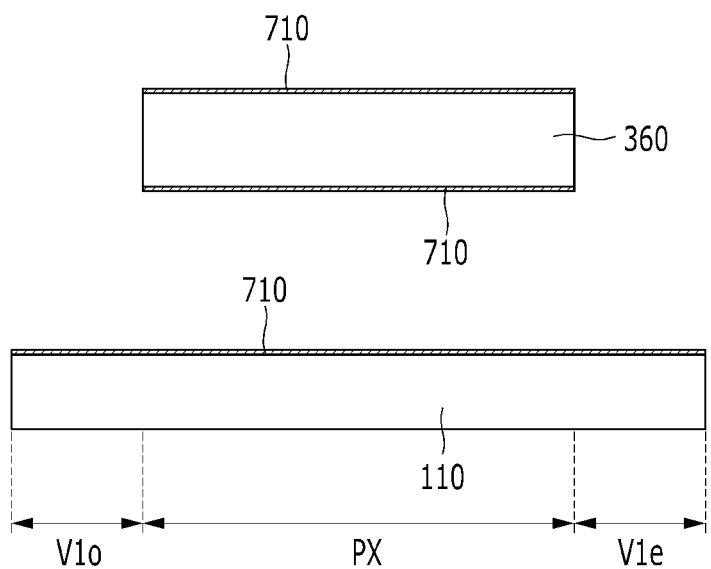

As illustrated in FIG. 12, the hydrophilic treatment is performed under a condition having high isotropy, such that the upper surface of the substrate 110 has hydrophilicity even in the microcavity 305, and the lower surface of the roof layer 360 has hydrophilicity. Although not illustrated, the pixel electrode is formed on the substrate 110 in the microcavity 305 such that the upper surface of the pixel electrode has hydrophilicity. Moreover, the upper surface of the roof layer 360 also has hydrophilicity.

Figure 13:
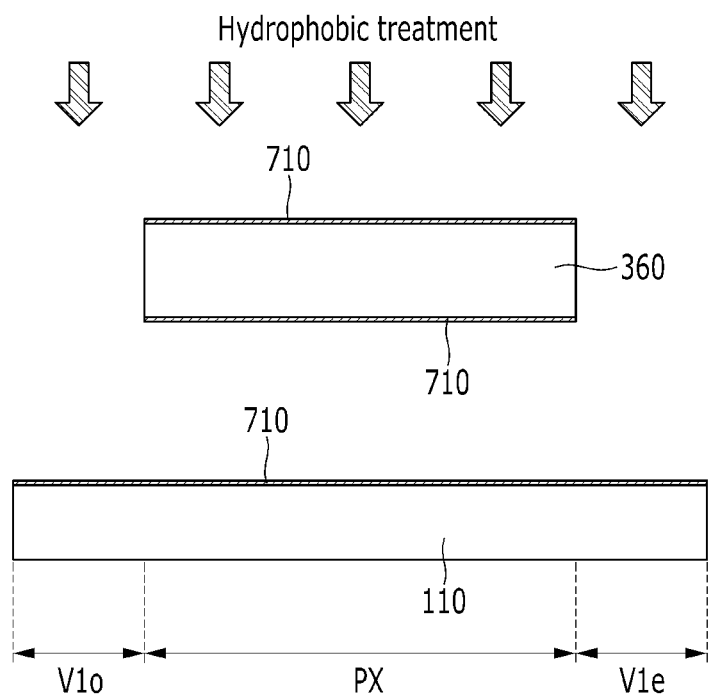

As illustrated in FIG. 13, a hydrophobic treatment process is performed on the substrate 110. The hydrophobic treatment may use a method of depositing a hydrophobic material, or may use a method of etching using gas including fluorine.

In a case in which the deposition method is used, for example, as a hydrophobic material, polytetrafluoroethylene (PTEE), tridecafluoro-1,1,2,2-tetrahydrooctyl-trichlorosilane (F-TCS), (tridecafluoro-1,1,2,2-Tetrahydrooctyl)-trichlorosilane (FOTS), 2-[methoxy(polyethylenoxy)propyl]trichlorosilane (PEG), (3-Aminopropyl)trimethoxysilane (APTMS), octadecyltrichlorosilane (OTS), octadecyltrimethoxysilane (OTMS), or the like may be used.

In a case in which the etching method is used, for example, octafluorocyclobutane (C4F8), tetrafluoromethane (CF4), trifluoromethane (CHF3), or the like may be used.

Figure 14:
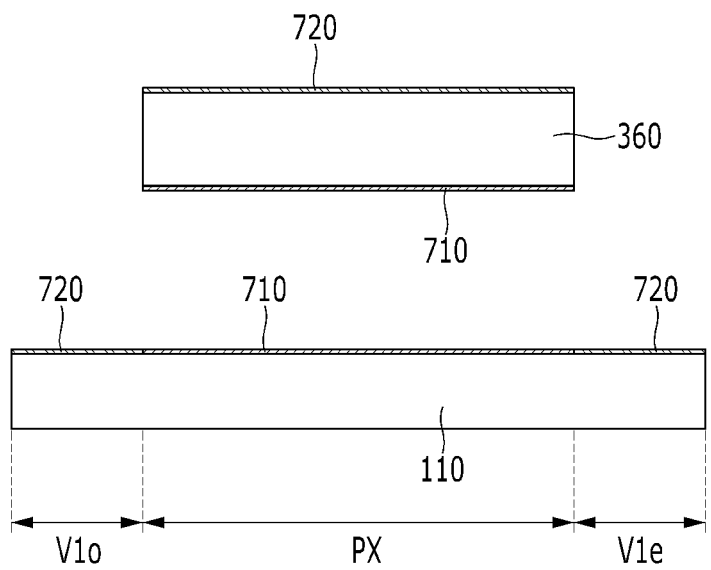

As illustrated in FIG. 14, the hydrophobic treatment is performed under a condition having high anisotropy, such that only a portion where the upper surface is exposed has hydrophobicity. The upper surface of the substrate 110 in the first valley V1 has hydrophobicity, and the upper surface of the roof layer 360 in the pixel area PX has hydrophobicity.

Figure 15:
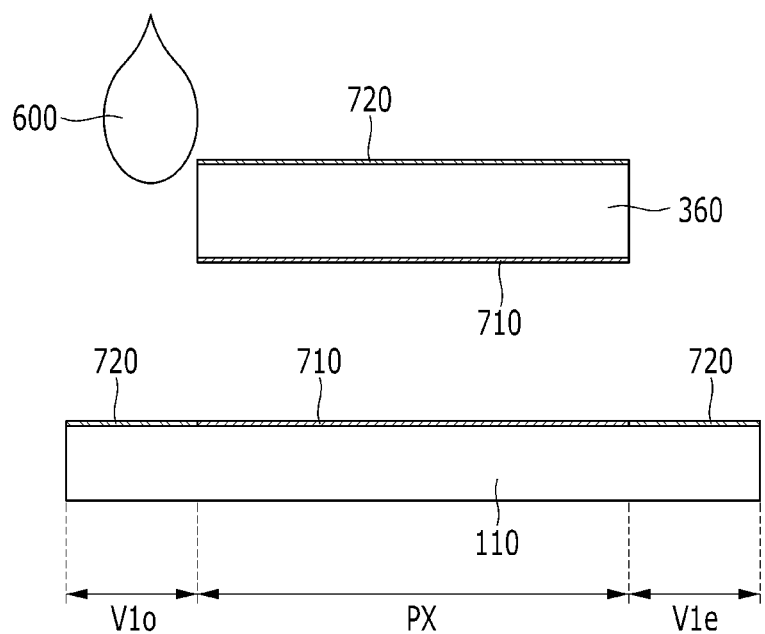

As illustrated in FIG. 15, the alignment agent 600 is supplied to the first valley V1o in the odd row, but is not supplied to the first valley V1e in the even row. As described above, the alignment agent 600 may be supplied to the first valley V1e in the even row, but may not be supplied to the first valley V1o in the odd row.

Figure 16:
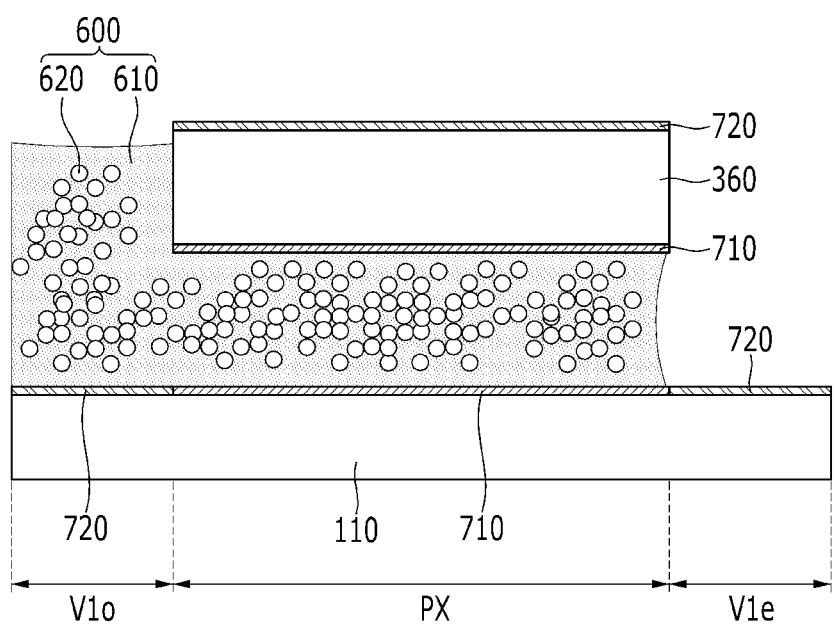

As illustrated in FIG. 16, the alignment agent 600 is injected into the microcavity 305 by capillary force. The interior of the microcavity 305 is filled with the alignment agent 600, and a level of the alignment agent 600 in the first valley V1o in the odd row reaches a height of the roof layer 360. The alignment agent 600 does not absolutely reach the first valley V1e in the even row, or a small amount of the alignment agent 600 reaches the first valley V1e in the even row.

The alignment agent 600 is formed of an alignment material 620 made of a solid substance, and a solvent 610 that encloses the alignment material 620.

Figure 17:
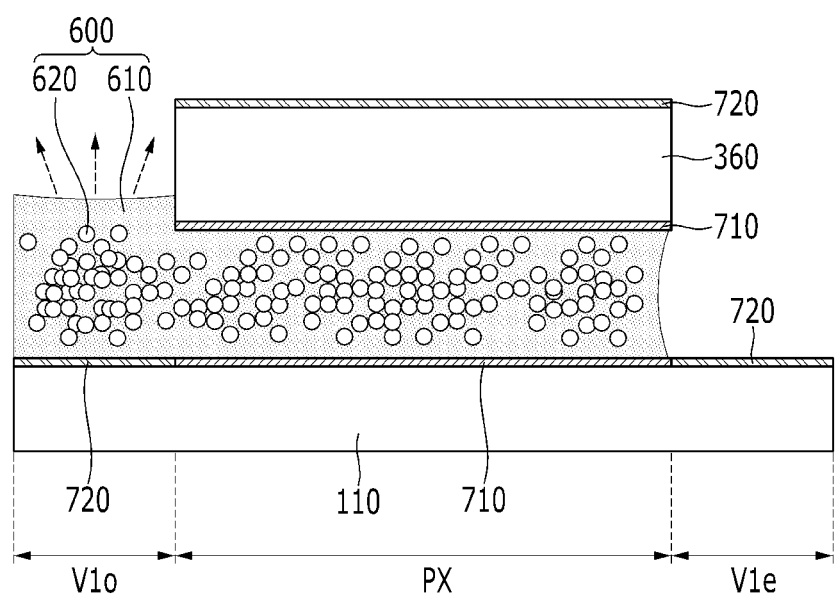

As illustrated in FIG. 17, when the curing process is performed, the solvent 610 evaporates. At this time, a level of the alignment agent 600 in the first valley V1o in the odd row and a level of the alignment agent 600 in the first valley V1e in the even row are different from each other such that the solvent 610 positioned in the first valley V1o in the odd row evaporates first. As the solvent 610 evaporates, the alignment material 620 made of a solid substance is gradually moved downward.

Figure 18:
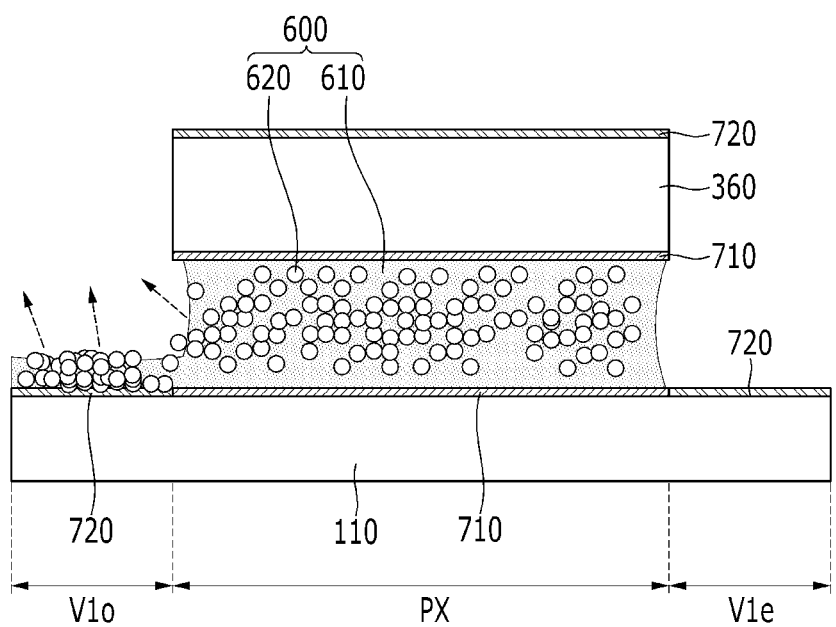

As illustrated in FIG. 18, the solvent 610 positioned to be adjacent to the first valley V1e in the even row does not evaporate until all the solvent 610 positioned in the first valley V1o in the odd row evaporates. The alignment material 620 which has been included in the alignment agent 600 positioned in the first valley V1o in the odd row remains on the surface of the first valley V1o in the odd row in a thick state.

Figure 19:
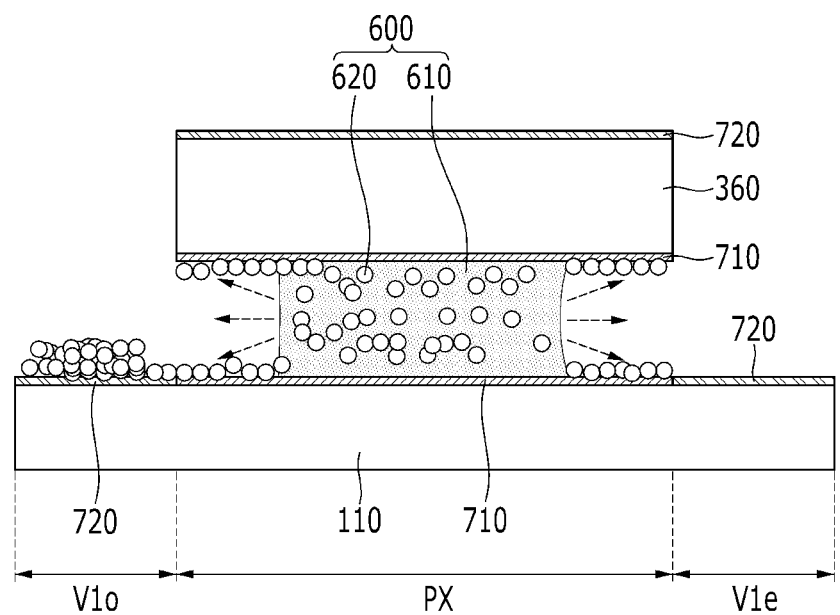

As illustrated in FIG. 19, the solvent 610 positioned to be adjacent to the first valley V1o in the odd row and the solvent 610 positioned to be adjacent to the first valley V1e in the even row simultaneously evaporate. The solvent 610 positioned in the microcavity 305 evaporates through the injection holes 307 positioned at both sides of the microcavity 305. At this time, the solvent 610 sequentially evaporates from a portion that is exposed to the outside.

As the solvent 610 evaporates, the alignment material 620 made of a solid substance remains on an inner wall of the microcavity 305. The alignment material 620 remains on the upper surface of the substrate 110, and the lower surface of the roof layer 360. Although not illustrated, the pixel electrode is formed on the substrate 110 in the microcavity 305 such that the alignment material 620 remains on the upper surface of the pixel electrode.

Figure 20:
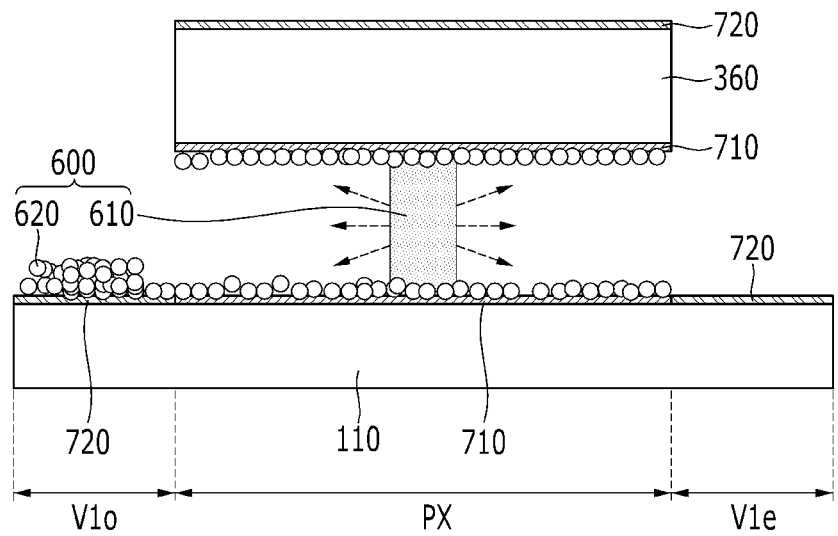

As illustrated in FIG. 20, the solvent 610 sequentially evaporates from a portion that is exposed to the outside, and thus remains at a center of the microcavity 305. Next, the solvent 610 positioned at a center of the microcavity 305 also evaporates.

Figure 21:
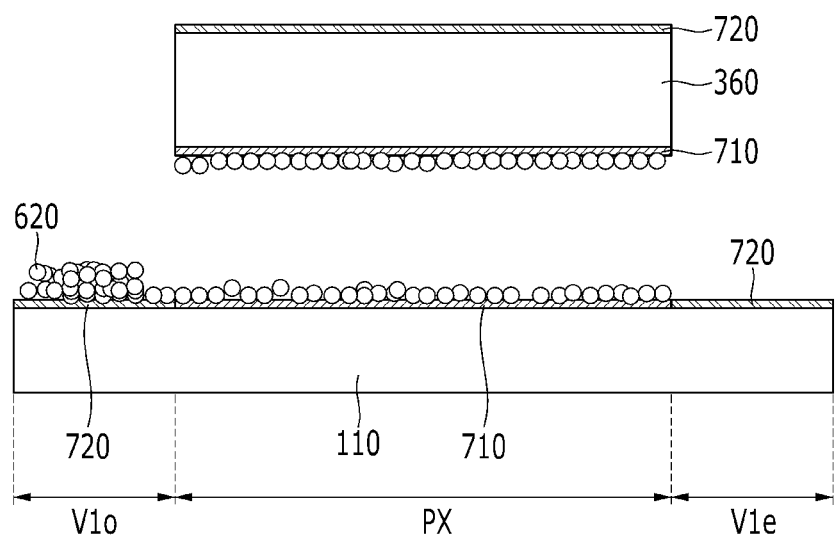

As illustrated in FIG. 21, all the solvent 610 in the microcavity 305 evaporates, and the alignment material 620 remains on the upper surface of the substrate 110 and the lower surface of the roof layer 360 so as to form the alignment layer. In the microcavity 305, the alignment material 620 remains on the upper surface of the substrate 110 and the lower surface of the roof layer 360 so as to have a predetermined thickness. A thickness of the alignment material 620 remaining in the first valley V1o in the odd row is formed to be larger than a thickness of the alignment material 620 remaining in the microcavity 305.

In some embodiments, a level of the alignment agent 600 in the first valley V1o in the odd row and a level of the alignment agent 600 in the first valley V1e in the even row are formed to be asymmetric to each other, such that a considerable part of the alignment material 620 made of a solid substance may remain in the first valley V1o in the odd row. Accordingly, a phenomenon in which the alignment material 620 is lumped in the microcavity 305 does not occur, and problems such as a light leakage in the pixel area PX, a reduction in contrast ratio, an increase in black luminance, and transmittance deterioration may be prevented.

While this invention has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a substrate;
a thin film transistor disposed on the substrate;
a pixel electrode connected to the thin film transistor;
a roof layer disposed on the pixel electrode;
a plurality of microcavities interposed between the pixel electrode and the roof layer;
a first valley extended in one direction between the plurality of microcavities;
an alignment layer disposed on the pixel electrode, under the roof layer, and in the first valley;
a liquid crystal layer disposed in the plurality of microcavities; and
an encapsulation layer disposed on the roof layer to seal the plurality of microcavities,
wherein the plurality of microcavities is disposed in the form of a matrix, the first valley is extended in a row direction between the plurality of microcavities, and includes a first odd valley in an odd row and a first even valley in an even row, and the alignment layer is disposed in one of the first odd valley or the first even valley, and is not disposed in the other one.

2. The display device of claim 1, wherein:
a thickness of a portion of the alignment layer positioned in the first valley is larger than a thickness of a portion of the alignment layer positioned on the pixel electrode.

3. The display device of claim 2, wherein:
the thickness of the portion of the alignment layer positioned in the first valley is larger than a thickness of the portion of the alignment layer positioned under the roof layer.

4. The display device of claim 1, wherein:
a surface of the first valley has hydrophobicity, and an upper surface of the pixel electrode and a lower surface of the roof layer have hydrophilicity.

5. A display device comprising:
a substrate;
a thin film transistor disposed on the substrate;
a pixel electrode connected to the thin film transistor;
a roof layer disposed on the pixel electrode;
a plurality of microcavities interposed between the pixel electrode and the roof layer;
a first valley extended in one direction between the plurality of microcavities;
an alignment layer disposed on the pixel electrode, under the roof layer, and in the first valley;
a liquid crystal layer disposed in the plurality of microcavities; and
an encapsulation layer disposed on the roof layer to seal the plurality of microcavities,
wherein the plurality of microcavities is disposed in the form of a matrix, the first valley is extended in a row direction between the plurality of microcavities, and includes a first odd valley in an odd row and a first even valley in an even row, the alignment layer is formed in the first odd valley and the first even valley, and a thickness of a portion of the alignment layer positioned in the first odd valley is larger than a thickness of a portion of the alignment layer positioned in the first even valley.

6. The display device of claim 5, wherein:
the thickness of the portion of the alignment layer positioned in the first odd valley is larger than a thickness of a portion of the alignment layer positioned on the pixel electrode.

7. The display device of claim 6, wherein:
the thickness of the portion of the alignment layer positioned on the pixel electrode is larger than the thickness of the portion of the alignment layer positioned in the first even valley.

8. A method of manufacturing a display device comprising:
forming a thin film transistor on a substrate;
forming a pixel electrode connected to the thin film transistor;
forming a sacrificial layer on the pixel electrode;
forming a roof layer on the sacrificial layer;
forming an injection hole by patterning the roof layer so that a part of the sacrificial layer is exposed;
forming a plurality of microcavities between the pixel electrode and the roof layer by removing the sacrificial layer, and forming a first valley extended in one direction between the plurality of microcavities;

performing a hydrophilic treatment of an upper surface of the pixel electrode and a lower surface of the roof layer;

performing a hydrophobic treatment on a surface of the first valley;

forming alignment layer on the pixel electrode, under the roof layer, and in the first valley by injecting an alignment agent through the injection hole;

forming a liquid crystal layer in the plurality of microcavities by injecting a liquid crystal material through the injection hole; and sealing the plurality of microcavities by forming an encapsulation layer on the roof layer so as to cover the injection hole.

9. The method of claim 8, wherein:

the plurality of microcavities is disposed in the form of a matrix, and the first valley is extended in a row direction between the plurality of microcavities, and includes a first odd valley in an odd row and a first even valley in an even row.

10. The method of claim 8, wherein:

performing the hydrophobic treatment on the surface of the first valley comprises at least one of depositing a hydrophobic material on the substrate or etching using gas including fluorine.

11. The method of claim 8, wherein:

performing the hydrophobic treatment on the surface of the first valley comprises a condition having high anisotropy.

12. The method of claim 8, wherein:

performing the hydrophilic treatment on the surfaces of the pixel electrode and of the roof layer comprises a condition having high isotropy.

13. The method of claim 8, wherein:

the alignment agent is supplied to only one of the first odd valley or the first even valley.

14. The method of claim 13, wherein:

the alignment agent includes an alignment material comprising a solid substance, and a solvent, wherein the solvent evaporates and the alignment material remains on the pixel electrode, under the roof layer, and in the first valley so as to form the alignment layer.

15. The method of claim 14, wherein:

the alignment layer is formed in one of the first odd valley or the first even valley, and a thickness of the alignment layer positioned in the first valley is larger than a thickness of the alignment layer positioned on the pixel electrode.

* * * * *